US007206099B2

(12) United States Patent
Brewington et al.

(10) Patent No.: US 7,206,099 B2
(45) Date of Patent: Apr. 17, 2007

(54) MEDIA/SCREEN LOOK-UP-TABLE FOR COLOR CONSISTENCY

(75) Inventors: Grace T. Brewington, Fairport, NY (US); Peter A. Crean, Penfield, NY (US); Lalit K. Mestha, Fairport, NY (US); Gary W. Skinner, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1014 days.

(21) Appl. No.: 10/196,837

(22) Filed: Jul. 16, 2002

(65) Prior Publication Data

US 2004/0012817 A1   Jan. 22, 2004

(51) Int. Cl.
H04N 1/405    (2006.01)

(52) U.S. Cl. .................. 358/3.06; 358/1.9; 345/589; 345/590; 345/596; 345/599

(58) Field of Classification Search ................ 358/527, 358/504, 1.9, 3.06, 3.23, 520; 399/1, 49; 347/251; 345/590, 589, 599, 596
See application file for complete search history.

(56) References Cited

U.S. PATENT DOCUMENTS

| | | | | |
|---|---|---|---|---|
| 5,081,596 A | * | 1/1992 | Vincent et al. ............. | 358/1.4 |
| 5,206,686 A | * | 4/1993 | Fukui et al. ................. | 399/1 |
| 5,255,085 A | * | 10/1993 | Spence ....................... | 358/527 |
| 5,333,069 A | * | 7/1994 | Spence ....................... | 358/517 |
| 5,777,656 A | * | 7/1998 | Henderson ................... | 347/251 |
| 5,897,239 A | | 4/1999 | Caruthers, Jr. et al. | |
| 5,963,244 A | * | 10/1999 | Mestha et al. .............. | 347/251 |
| 6,014,499 A | * | 1/2000 | Sasaki ........................ | 358/1.9 |
| 6,048,117 A | * | 4/2000 | Banton .................. | 400/120.09 |
| 6,154,288 A | * | 11/2000 | Watanabe ................... | 358/1.9 |
| 6,181,888 B1 | * | 1/2001 | Scheuer et al. ............... | 399/49 |
| 6,191,867 B1 | * | 2/2001 | Shor et al. .................... | 358/1.9 |
| 6,198,886 B1 | * | 3/2001 | Brewington .................. | 399/49 |
| 6,236,474 B1 | * | 5/2001 | Mestha et al. .............. | 358/520 |
| 6,249,315 B1 | | 6/2001 | Holm | |
| 6,344,902 B1 | * | 2/2002 | Duke et al. .................. | 358/1.9 |
| 6,351,308 B1 | | 2/2002 | Mestha | |
| 6,351,320 B1 | * | 2/2002 | Shin ........................... | 358/1.9 |
| 6,366,362 B1 | | 4/2002 | Butterfield et al. | |
| 6,381,035 B1 | * | 4/2002 | Zhang et al. ................ | 358/1.9 |

(Continued)

FOREIGN PATENT DOCUMENTS

JP    10327330    12/1998

(Continued)

Primary Examiner—Aung Moe
Assistant Examiner—Ashish K. Thomas
(74) Attorney, Agent, or Firm—Fay Sharpe LLP

(57) ABSTRACT

In an image rendering system, a method of compensating for system performance changes related to image attributes includes rendering a diagnostic image, sensing at least one image quality from the diagnostic image, updating an image attribute compensation tone reproduction curve based on the sensed image quality and rendering an image based on the updated image attribute compensation tone reproduction curve. For example, image attributes include print media type and a halftone screen selection. An image processing system operative to perform the method of compensation includes a set of image attribute compensation tone reproduction curves. Each curve of the set is associated with a particular combination of image attributes. For example, each curve is associated with a particular media type/halftone screen combination.

21 Claims, 10 Drawing Sheets

U.S. PATENT DOCUMENTS

| | | | |
|---|---|---|---|
| 6,396,595 B1 * | 5/2002 | Shimazaki | 358/1.9 |
| 6,441,923 B1 * | 8/2002 | Balasubramanian et al. | 358/3.23 |
| 6,469,805 B1 * | 10/2002 | Behlok | 358/1.9 |
| 6,538,661 B1 * | 3/2003 | Farnung et al. | 345/594 |
| 6,965,462 B1 * | 11/2005 | Henderson et al. | 358/504 |
| 2002/0085234 A1 * | 7/2002 | VanDuyn et al. | 358/3.06 |
| 2002/0085235 A1 * | 7/2002 | Degani et al. | 358/3.06 |
| 2002/0105527 A1 * | 8/2002 | Hata et al. | 345/589 |
| 2003/0007154 A1 * | 1/2003 | Tandon et al. | 356/406 |

FOREIGN PATENT DOCUMENTS

| | | |
|---|---|---|
| JP | 3093722 | 10/2000 |

* cited by examiner

MEDIA/SCREEN LOOK-UP-TABLE FOR COLOR CONSISTENCY

BACKGROUND OF THE INVENTION

This invention relates generally to an electrophotographic printing system and more particularly concerns a method and apparatus which uses a set of tone reproduction curves customized to compensate for system performance changes related to two or more image attributes. For example, the invention will be described in terms of a xerographic environment where a set of tone reproduction curves is generated and used to compensate for system performance changes related to media type and halftone screen selections. However, those of skill in the art will understand that the invention can be applied to other image attribute combinations and in other image processing applications.

By way of background, digital reproduction, transfer or display of original images on image output terminals begins by creating a digital representation of an original image. Commonly, the digital representation becomes a two-tone microstructure otherwise known as a halftone or binary bitmap. In conventional halftoning, multiple gray levels or gray densities in the original image are reproduced by varying the amplitude within a fixed spatial frequency of halftone microstructures (or halftone cells/dots). Continuous tone images or image portions are typically represented in binary format by creating halftone cells or dots, where each cell represents a gray level density within an area of picture elements (pixels).

Methods of halftone digital image processing, encompassing the process steps of scanning or image acquisition through printing or display are known. In general, digital image output terminals (e.g., printers) are capable of creating spots within an area with a predetermined resolution (dots per unit area). In scanners, a single "spot" describes a multi-bit density response. Typically, input scanners may acquire density information at 256 levels of gray to describe a spot or pixel. By contrast, output terminals generally have two or another relatively small number of levels to reproduce image information.

In printing systems, maintaining stability and accuracy as to the amount of a marking material (e.g., toner or ink) being applied to a print surface is a major concern. Specifically, it is known that due to varying conditions, the amount of marking material (e.g., cyan, magenta, yellow and black toner or ink) will fluctuate from a predetermined target value. For example, humidity, toner or ink age, machine calibration, toner or ink quality can all cause the amount of marking material applied to a print surface to vary.

Therefore, for copiers and printers, a common technique for monitoring the quality of documents is to create test patches of predetermined desired densities. The actual density of the toner of the test patches can then be optically measured to determine the effectiveness of the printing process in placing this printing material on the print sheet.

In a xerographic environment, the surface that is typically of most interest in determining the density of printing material is a charge-retentive surface or photoreceptor, on which an electrostatic latent image is formed, and subsequently developed, by causing toner particles to adhere to areas that are charged in a particular way. In such a case, the density detector for determining the density of toner on the test patch, which is often referred to as a "densitometer," is disposed along the path of the photoreceptor directly downstream of the development unit. There is typically a routine within the operating system of the printer to periodically create test patches of a desired density at predetermined locations on the photoreceptor by deliberately causing the exposure system to charge or discharge, as necessary, the surface at a predetermined location.

The test patches are moved past the development unit and the toner particles within the development unit are caused to electrostatically adhere to the test patches. The denser the toner on the test patches, the darker the test patches will appear in optical testing. The developed test patches are moved past a density detector (densitometer) disposed along the path of the photoreceptor, and the light absorption of the test patch is tested; the more light that is absorbed by the test patch, the denser the toner on the test patch. Xerographic test patches are traditionally printed in the inter-document zones on the photoreceptor. They are used to measure the deposition of toner to measure and adjust or update Tone Reproduction Curves (TRC). A common method of process control involves scheduling solid area, uniform halftones or background test patches. High-quality printers will often use many test patches.

Depiction of a process whereby a printing machine maintains output print density is illustrated in FIG. 1. Shown is an image path A for a print machine where a page description module (which implements a Page Description Language (PDL) such as, but not limited to, PostScript®) 10 forwards image information to raster image processor module (RIP) 12. The RIP generates a rasterized image (in this example, a 600×600×8 image) 14. Through this procedure, a contone image (e.g., having cyan, magenta, yellow and black) is described in a gray level or contone format. A Contone Rendering Module (CRM) 16 receives the rasterized image 14 and performs a halftoning operation 16a on the rasterized image 14 in accordance with a predetermined Tone Reproduction Curve (TRC) 16b. The CRM 16 then generates a rasterized binary (halftoned) image having a high addressability factor (e.g., 4800×600×1) 18. This binary image is provided to a Raster Output Scanner (ROS) 20, which in turn generates a photoreceptor image 22. Using the photoreceptor image 22, normal known xerographic operations are undertaken for the generation of a color print.

Consistent tone reproduction is a high priority in color production markets. Even slight color changes within a job can be objectionable to a customer. Within the architecture described in FIG. 1, constant tone reproduction for printed outputs over time is maintained by feeding real-time (inter-document zone) xerographic density information to the CRM 16 of the print engine. The CRM 16 applies an appropriate TRC 16b to each contone image and then the image is halftoned to a binary high-addressable image space understood by the ROS 20.

Data concerning the xerographic density of patches on photoreceptor image 22 are provided to the CRM 16 by process control feedback 24. In order to maintain a stable printing operation despite the fact that the print engine output may be varying, the tone reproduction curve (TRC) 16b is applied immediately before the halftoner operation 16a. Thus, if the signal from process control feedback 24 indicates that the xerographic density values are off a nominal amount, TRC 16b is changed in front of halftoner operation 16a in order to provide desired print outputs. For example, if the printer is determined to be printing overly high yellow amounts of toner, the tone reproduction curve will be adjusted slightly down so that the yellow toner amount requested is decreased, thereby maintaining a stable printing output. Densitometer measurements are made on a regular basis and the TRC 16b is updated on a regular basis in an attempt to maintain consistent color reproduction performance over time, temperature, humidity and other variables, so that, for example, all the prints in a print job are produced as consistently as possible, even when a customer job is not completely printed before the xerographic density state of the system changes.

FIGS. 2 and 3 illustrate an exemplary image printing system 30 which can incorporate the image path A described above or be modified to practice the methods of the present invention. Printing system 30, for purposes of explanation, is divided into image input section 32, controller section 34 and printer section 36. In the example shown, the image input section 32 has both remote and on-site image inputs, enabling system 30 to provide network, scan and print services. Other system combinations may be envisioned such as a stand-alone printing system with on-side image input (i.e., a scanner), controller and printer, a network printing system with remote input, controller and printer, among other configurations.

While a specific printing system is shown and described, the present invention may be used with other types of printing systems. For example, printer section 36 may instead use a different type of rendering device or print engine, such as ink jet, ionographic, lithographic, thermal and photographic, among others.

For off-site image input, image input section 32 has a network connection 38 with a suitable communication channel such as an EtherNet® connection enabling image data in the form of image signals or pixels from one or more remote sources to be input to system 30 for processing. Where the Page Description Language (PDL) of the incoming imaging data is different than the PDL used by system 30, suitable conversion means (not shown) are provided. Other remote sources of image data such as streaming tape, floppy disk, video camera, among others are within the scope of this invention.

For on-site image input, section 32 has a document scanner section 40 with a Universal Document Handler (UDH) 42 for the purpose of automatically and sequentially placing and locating sets of multiple documents for scanning. Scanner section 40 incorporates one or more linear light-sensitive arrays 44 for reciprocating scanning movement below platen 46 and focused on a line-like segment of platen 46 and the document being scanned thereon. Array 44, which may utilize Charge-Coupled Device (CCD) technology or the like, provides image elemental signals or pixels representative of the image scanned which are input to processor 48 for processing.

Processor 48 communicates with the controller section 34 and includes a scanner system control 48a, an automatic gain control printed wiring board (AGCPWB) 48b and a processor 48c. AGCPWB 48b converts the analog image signals output by array 44 to digitally represented facsimile signals, and processor 48c processes the digital image signals as required to enable controller section 34 to store and handle the image in the form and order required to carry out the job programmed. After processing, the image signals are output to controller section 34. Image signals derived from network 38 are similarly input to processor 48c.

Processor 48c also provides enhancements and changes to the image signals such as filtering, thresholding, screening, cropping, scaling (reduction/enlargement), etc.

Printer section 36 comprises a laser-type printer having a Scan Line Buffer 49, Raster Output Scanner (ROS) 50, Print Module 52, Paper Supply 54, Finisher 56, and Printer System Control 38. ROS 50 has a two-beam laser with the beams modulated in accordance with the content of an image signal input by acousto-optic modulator to provide dual-imaging beams which are scanned across a moving photoreceptor of Print Module 52 by means of a rotating polygon. This exposes two image lines on the photoreceptor with each scan to create the latent electrostatic images represented by the image signal input to the modulator.

The latent electrostatic images are developed and transferred to a print media delivered by paper supply 54. As will be appreciated by those skilled in the art, print media can comprise a selected one of various known substrates which are capable of accepting an image, such substrates including transparencies, preprinted sheets, vellum, glassy covered stock, film or the like. The print media may comprise any of a variety of sheet sizes, types and colors, and for this, plural media supply trays are provided. The transferred image is permanently fixed or fused and the resulting prints discharged to either output tray 60 (FIG. 2), or to finisher 62. Finisher 62 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Color consistency control algorithms such as those described in reference to FIG. 1 are constantly being improved upon. Additionally, alternative techniques, including for example, techniques involving gray balance control have been introduced. As a result, image processing systems such as that depicted in FIG. 2 and FIG. 3, and available alternative systems, are now capable of maintaining color within a few $\Delta E_{cmc}$. However, control algorithms such as those described in reference to FIG. 1 do not take into account, and therefore do not compensate for, all the variables or image attributes in an imaging system. For example, the color consistency control system of FIG. 1 does not take into account the effect of media selection has on color. Additionally, the color consistency control system of FIG. 1 does not consider the effects of an interaction of a selected halftone screen with a particular kind of media.

The effects of image attributes such as media selection and halftone screen selection were once considered insignificant. However, as color consistency control techniques have improved, the effect of such image attributes has become noticeable and problematic.

Therefore, there has been a desire for a method of compensating for system performance changes such as color changes, due to image attribute changes.

SUMMARY OF THE INVENTION

A method of compensating for system performance changes related to image attributes includes selecting a first and second image attribute to be compensated for, changing a value of at least one of the first attribute and the second attribute, rendering a diagnostic image based on the changed value of the first and second attribute combination, sensing an image quality from the rendered diagnostic image, calculating first attribute/second attribute tone reproduction curve data based on the sensed image quality, storing the first attribute/second attribute tone reproduction curve data for use in rendering images having the changed first and second attribute combination values, receiving production image data for a production image having the first and second attribute values and, applying the stored first attribute/second attribute tone reproduction curve data to the received production image data, thereby generating compensated image data. When a production image having the first and second attribute values is to be rendered, the stored first attribute/second attribute tone reproduction curve data is used to adjust the production image to compensate for the first and second attribute.

For example, the first and second attributes can be a media type an image is to be rendered on, and a halftone screen type used to render the image. Sensing an image quality can include sensing an image color. For example, an image color is sensed with a spectrophotometer. In this example, color changes that would otherwise occur due to a change in media or halftone screen are prevented or minimized.

A method of rendering a print job image that uses the method of compensating for system performance changes related to image attributes includes selecting first and second image attributes, receiving a value change, for at least one of the first attribute and the second attribute, associated with the print job image, rendering a diagnostic image based on the changed first and second attribute value combination, sensing an image quality from the rendered diagnostic image, calculating first attribute/second attribute tone reproduction curve data based on the sensed image quality, storing the first attribute/second attribute tone reproduction curve data for use in rendering images having the changed first and second attribute values, adjusting a contone value of the print job image based on the stored first attribute/second attribute tone reproduction curve data and, rendering the print job image based on the adjusted contone value.

An image processing system operative to compensate for image aspects as described above includes a set of image aspect compensation tone reproductions curves, each tone reproduction curve of the set being associated with a particular combination of two or more image aspects, an image quality sensor operative to measure one or more image qualities from a rendered image and an image aspect compensation processor. The image aspect compensation processor is operative to receive image data and information regarding the two or more image aspects, select the a tone reproduction curve from the set of image aspect compensation tone reproduction curves based on the information regarding the two or more image aspects and generate modified image data based on information received from the selected tone reproduction curve and the received image data. The image aspect compensation processor also updates portions of the set of image aspect compensation tone reproductions curves based on information generated by the image quality sensor. The image processing system also includes a rendering device that is operative to render an image based on the modified image data and the two or more image aspects.

In some embodiments the image quality sensor is a spectrophotometer.

In xerographic environments, the rendering device comprises a xerographic print engine.

In some embodiments the image processing system also includes a process control tone reproduction curve, a system performance sensor and a process control processor. One computational device, such as a microcontroller, microprocessor or digital signal processor can be both the process control processor and image aspect compensation processor. The process control processor is operative to receive modified image data, generate re-modified image data based on information received from the process control tone reproduction curve and the received modified image data. In these embodiments the rendering device is operative to render an image based not only on the modified data but also on the re-modified data. The process control processor is also operative to update portions of the process control tone reproductions curve based on information generated by the system performance sensor.

BRIEF DESCRIPTION OF THE DRAWINGS

The invention may take form in various components and arrangements of components, and in various procedures and arrangements of procedures. The drawings are not to scale and are only for purposes of illustrating a preferred embodiment and are not to be construed as limiting the invention.

DETAILED DESCRIPTION OF THE INVENTION

While the present invention will hereinafter be described in connection with preferred embodiments thereof, it will be understood that it is not intended to limit the invention to these embodiments. On the contrary, it is intended to cover all alternatives, modifications and equivalents as may be included within the spirit and scope of the invention as defined by the appended claims.

Figure 4:
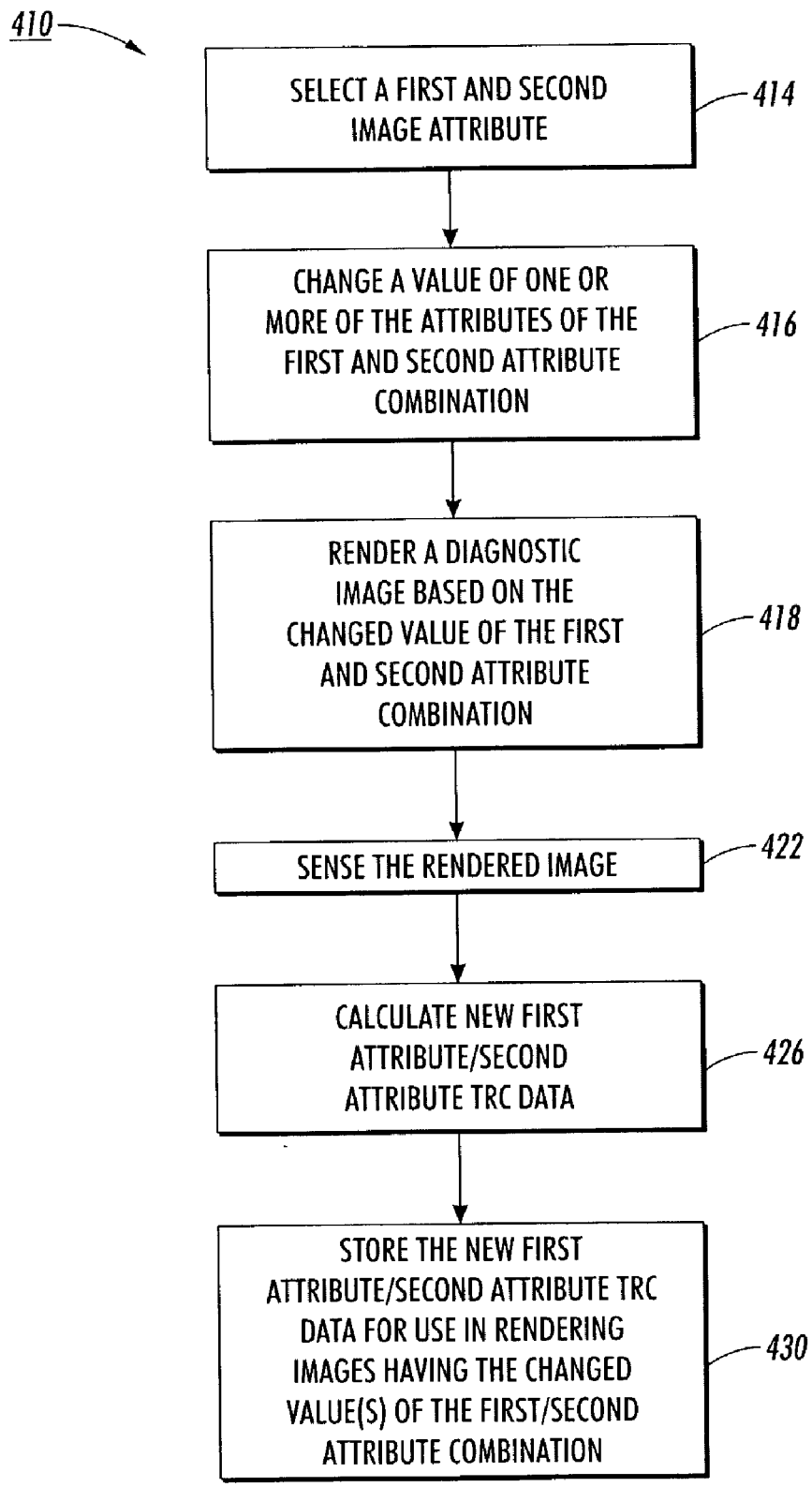
FIG. 4 is a flow chart summarizing a method of compensating for system performances changes related to selected image attributes.

Referring to FIG. 4, a method of compensating for system performance changes related to image attributes includes selecting first and second image attributes for compensating in relation to 414, changing 416 a value of at least one of the first and second attributes, rendering an image 418 for diagnostic sensing, based on the new value or values of the first and second attributes, sensing 422 performance aspects of the rendered image, calculating 426 new tone reproduction curve (TRC) data for a first attribute/second attribute value related TRC based on the sensed performance aspects, and storing 430 the new first and second attribute TRC data.

Preferably, the first and second image attributes are selected 414 because the first and second attributes can have a perceptible effect on a quality of an image rendered by an image-rendering system. For example, the kind of media (e.g., paper, transparencies, preprinted sheets, vellum, glassy covered stock, film) an image is rendered on, and the halftone screen selected to render the image, can have a perceptible effect on perceived colors in the rendered image. Media selection can influence the lightness or darkness of an image. Some halftone screens emphasize the shadows in an image while other halftone screens emphasize the highlights in an image. For these reasons, media and screen type can be selected as first and second image attributes to be compensated for.

Changing 416 a value of at least one of the first and second attributes occurs, for example, during the course of a print job. For instance, a cover of a booklet being printed might be printed on glossy paper and the balance of the booklet might be printed on plain paper. During the course of the print job, a change in a print media attribute from a value of plain paper (associated images of the balance of the booklet) to a value of glossy paper (associated with images of the cover of the booklet) constitutes a change in a value of at least one of the first and second attributes. Similarly, a change in halftone screen from, for example, a line screen to a dot screen would constitute a change in a value of at least one of the first and second attributes. A change in any of the selected attributes yields a new or changed first attribute/second attribute value combination.

Rendering 418 an image for diagnostic sensing purposes, based on the new first and second attribute value or values includes, for example, rendering an image on a particular media type with a particular halftone screen. For example, the diagnostic image includes a plurality of color patches (see FIG. 5) rendered on a sheet of the selected media type (e.g. velum or glossy paper) and rendered with the selected halftone screen(e.g., a line screen, a dot screen or a stochastic screen). Gray patches can be rendered instead of, or in addition to, the color patches. For instance, the gray patches are rendered by blending colorants such as, cyan, magenta, and yellow. Alternatively, the diagnostic image may be selected from a print job.

Preferably, a diagnostic image is printed during a print job. For example, when media changes in a print job from, for instance, plain paper to a glossy paper, color patches and/or gray patches are printed on a banner sheet. The banner sheet is sensed 422 and sent to a purge tray.

Alternatively, the diagnostic image is not a banner sheet but, rather, includes an image from a print job. For example, an image scheduled to be printed on the newly selected media with a selected halftone screen is rendered in the normal course of a print job. The image is sensed and either sent to a purge tray or included in the output stream of the job. For example, if the quality or color consistency of the image is high, it is included in the output stream. If the quality of the image is determined to be outside a quality or color consistency tolerance level, the image is purged.

Where a purge tray is unavailable, a diagnostic image can be removed from a job output stream by a system operator. Where a diagnostic image is an image from a print job and not easily identifiable, when necessary the diagnostic image can be marked for removal by an operator.

Sensing 422 the rendered diagnostic image may vary based on the selected first and second image attributes and the image quality they affect. For example, where the first and second image attributes are media and halftone screen type, sensing 422 the rendered image can include color sensing. For instance, a spectrophotometer can be used to measure the color reflectance of portions of the diagnostic image. Output from the sensor or sensing system is used as a measure of system performance.

Output from the sensor may be compared with expected target system performance values. Based on the comparison, new values are calculated 426 for a tone reproduction curve associated with the first and second selected image attributes. Where the sensed values are the same as or similar to the expected or target values, the new tone reproduction curve data may be the same as or similar to previously calculated tone reproduction curve data. However, where the sensor signals are significantly different than expected or target values, the new TRC data may be different than previously calculated TRC data. The new TRC data is calculated, for example, through color control or gray balance control algorithms known in the art.

Storing 430 new first and second attribute TRC data can include, for example, updating values in a TRC look-up-table (LUT) associated with the new first attribute/second attribute value combination.

Figure 5:
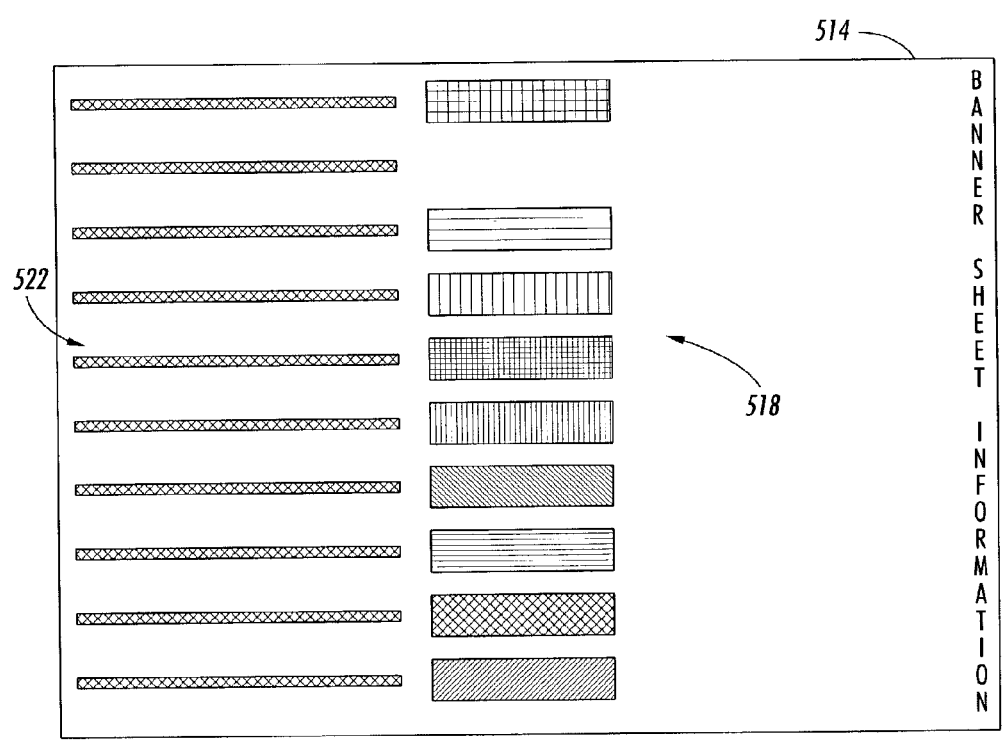
FIG. 5 is a diagram of an exemplary diagnostic image that can be used in the method of FIG. 4.

Referring to FIG. 5, a diagnostic image 514 can include a plurality of test patches 518. For example, the test patches 518 are of different colors. Each test patch 518 can include a color sweep. A color sweep is a test patch or test patch portion that varies in intensity or colorant density from one portion to another. It should be understood that in FIG. 5, different color or gray patches are represented by different black and white cross-hatching patterns. A diagnostic sheet 514 can also include fiduciary marks 522 or the like. For example, fiduciary marks 522 can provide control or actuation signals to sensor circuitry to indicate when the sensor should read a color patch. Alternatively, as explained above, diagnostic information may be extracted from a sheet produced in the course of producing a print job. In that case, the diagnostic sheet is diagnostic only in the sense that the sheet is selected to be used for sensing purposes.

Diagnostic sheets can be produced at the beginning of a print job, whenever selected image attributes change, or at regular intervals during a print job. For example, when the selected first and second image attributes are print media and halftone screens, diagnostic images can be produced whenever the print media or halftone screen used to render an image is changed, or, for example, at predetermined intervals associated with expected system performance drift.

Figure 6:
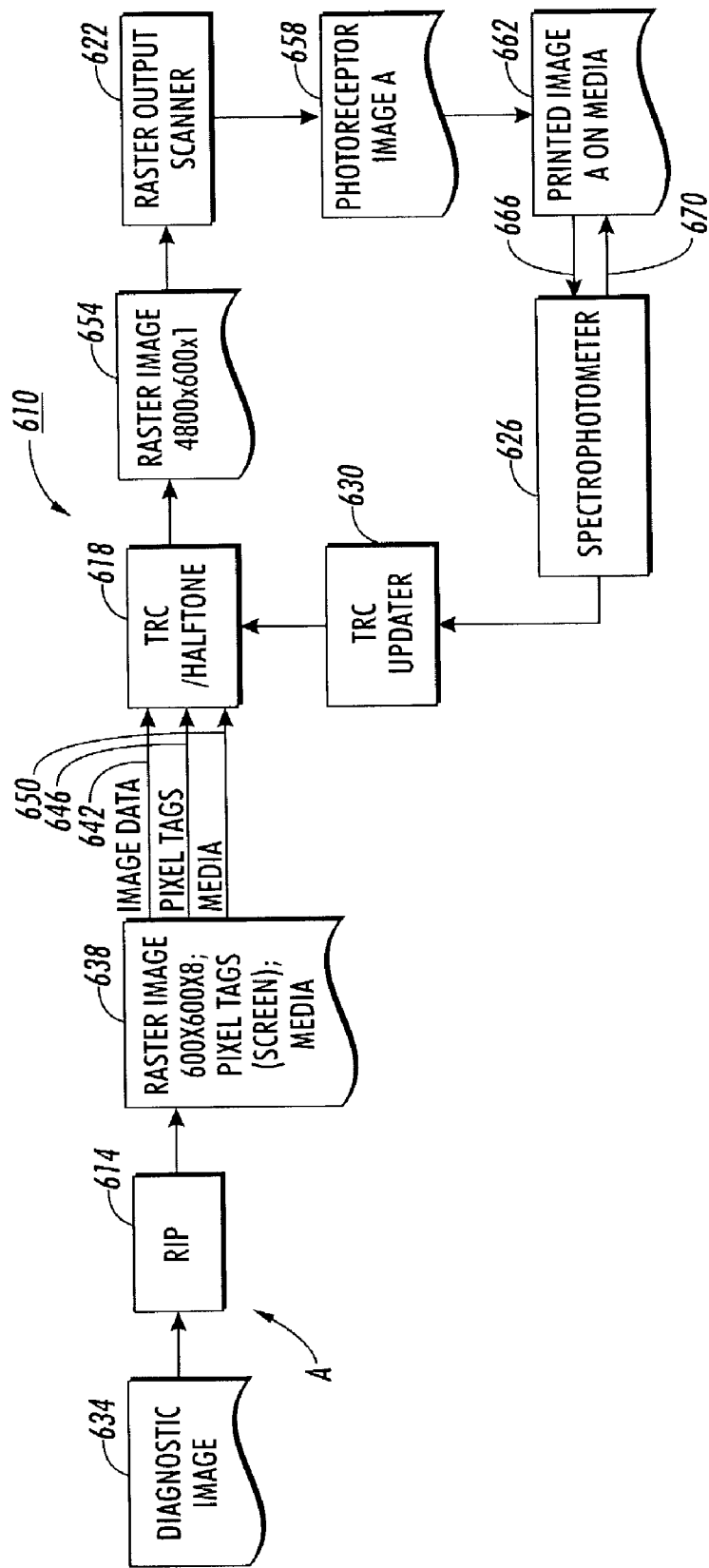
FIG. 6 is a block diagram of portions of a first exemplary system that is operative to perform the method of FIG. 4.

Referring to FIG. 6, an exemplary imaging system 610 operative to compensate for system performance changes related to image attributes as described in reference to FIG. 4 includes a Raster Image Processor (RIP) 614, a Contone Rendering Module 618, a Raster Output Scanner 622, an image quality sensor 626, and a tone reproduction curve updater 630. The Raster Image Processor 614, Contone Rendering Module 618, and Raster Output Scanner 622 are used during a regular image production as well as during diagnostic image production and image attribute compensation. During compensation update time, the Raster Image Processor 614 receives a diagnostic image 634. For example, the diagnostic image is received in the form of an image described in page description language such as, for example, Postscript®. The Raster Image Processor 614 generates a rasterized image from the received diagnostic image information. For example, the Raster Image Processor 614 generates a rasterized image 638 including image data 642. Additionally, the Raster Image Processor 614 extracts image attribute information from the diagnostic image 634. For example, the Raster Image Processor 614 extracts pixel tag information 646 and media selection information 650. For example, the pixel tag information includes screen selection information or rendering hints useful in selecting a screen. Alternatively, the Raster Image Processor 614 can assign media selection information. For instance, the Raster Image Processor 614 can assign a default media selection or a current media selection. As will be explained in greater detail in reference to FIG. 7, the Contone Rendering Module 618 uses the pixel tag information 646 and the media selection information 650 to select a lookup table or TRC related to selected image attributes to use in adjusting or modifying the received contone image data 642. The adjusted or modified contone image data is then halftoned by the Contone Rendering Module 618 through the halftone screen or screens indicated by the pixel tag information. The Contone Rendering Module 618 generates a raster image 654. For example, the Contone Rendering Module 618 produces a 4,800×600×1 bit raster image 654. The raster image 654 is passed to the Raster Output Scanner 622. For example, the Raster Image Processor 614 extracts pixel tag information 646 and media selection information 650. For example, the pixel tag information includes screen selection information or rendering hints useful in selecting a screen. Alternatively, the Raster Image Processor 614 can assign media selection information. For instance, the Raster Image Processor 614 can assign a default media selection or a current media selection. As will be explained in greater detail in reference to FIG. 7, the Contone Rendering Module 618 uses the pixel tag information 646 and the media selection information 650 to select a lookup table for TRC related to selected image attributes to use in adjusting or modifying the received contone image data 642. The adjusted or modified contone image data is then halftoned by the Contone Rendering Module 618 through the halftone screen or screens indicated by the pixel tag information. The Contone Rendering Module 618 generates a raster image 654. For example, the Contone Rendering Module 618 produces a 4,800×600×1 bit raster image 654. The raster image 654 is passed to the Raster Output Scanner 622.

Figure 1:
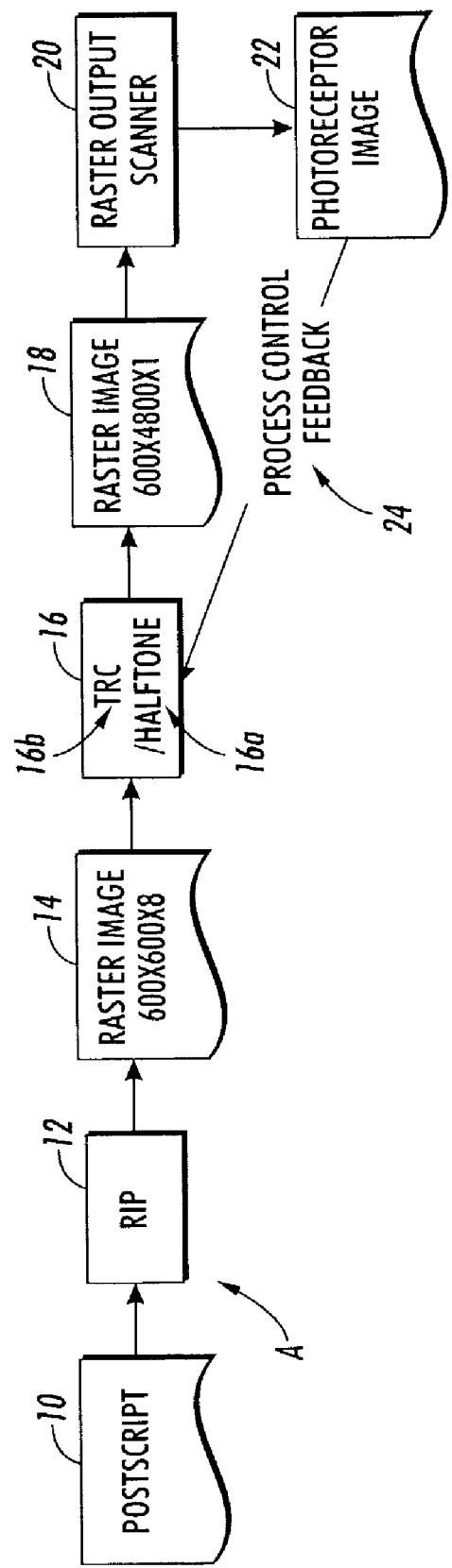
FIG. 1 is a block diagram of an image path incorporated into a prior art printing machine.
Figure 2:
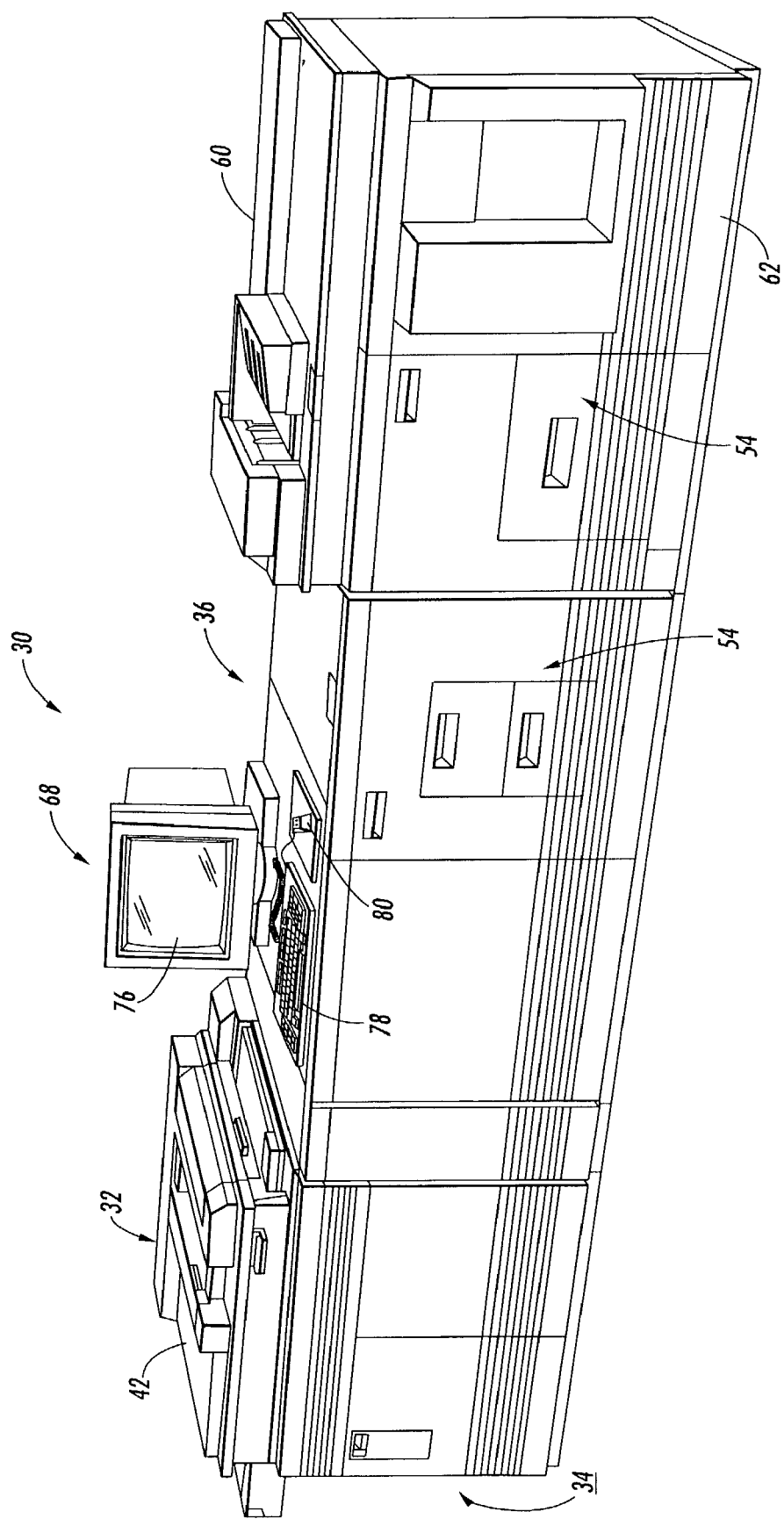
FIG. 2 is a view of depicting an exemplary electronic printing system appropriate for implementing the document processing technique of the present invention.
Figure 3:
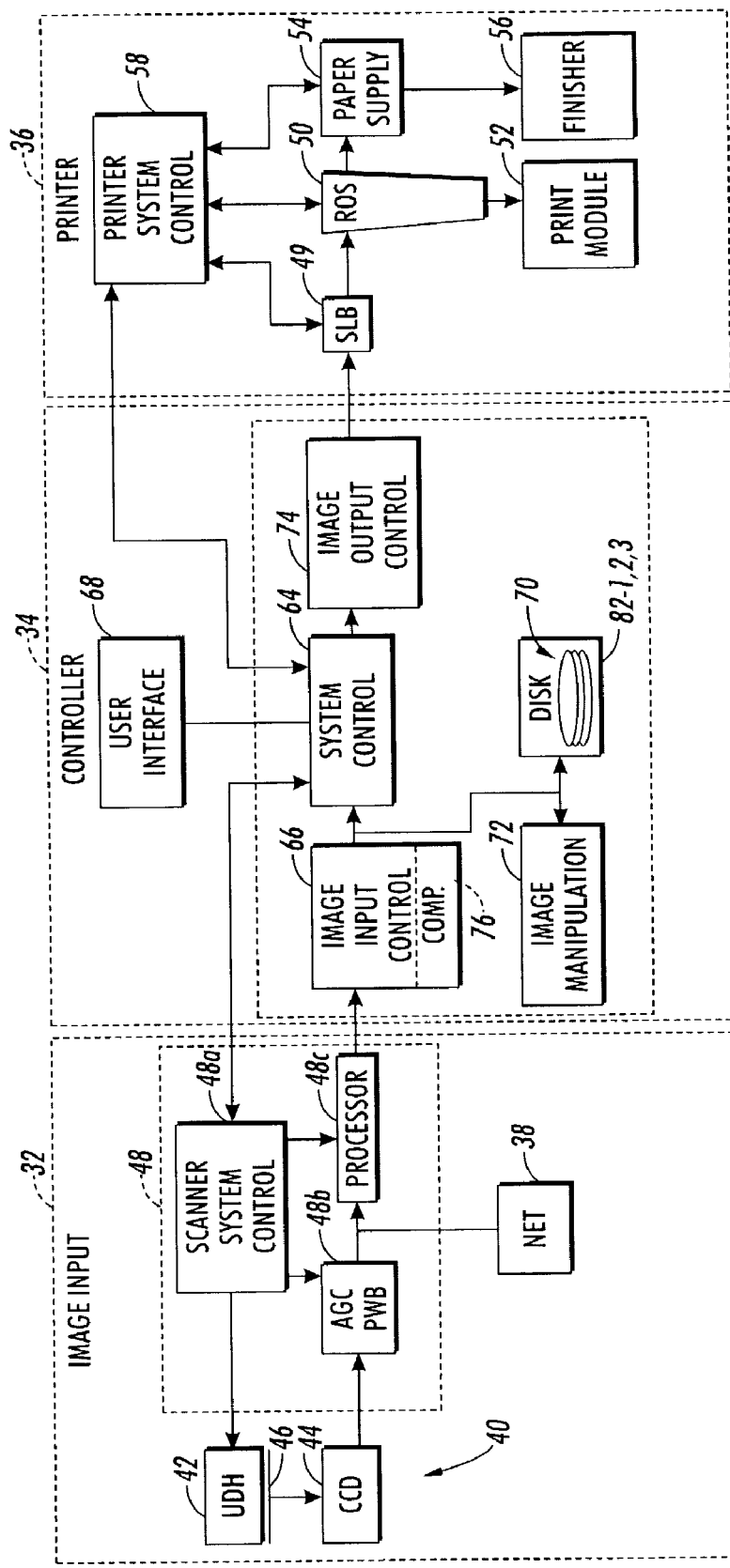
FIG. 3 is a block diagram depicting major elements of the printing system shown in FIG. 1.

The Raster Output Scanner 622 is similar to the Raster Output Scanner 20 described in reference to FIG. 1. The Raster Output Scanner 622 generates a photoreceptor image 658 on a photoreceptor (not shown). Processes and devices known in the art are used to render a media image 662 from the photoreceptor image 658. The media image is rendered on the media indicated in the media information 650 with the halftone screen indicated in the pixel tag information 646. The image quality sensor 626 senses one or more image qualities from the media image 622. For example, the image quality sensor 626 is a spectrophotometer. The spectrophotometer illuminates the media image 662 with one or more reference light sources 666. Reflected light 670 is received from the media image 662 and measured. The image quality sensor passes image quality signals to the TRC updater 630. The TRC updater 630 calculates new values for a tone reproduction curve associated with the selected first and second image attributes. For example, where the first and second image attributes are image media and halftone screen selections, the TRC updater 630 uses gray balance control or other control algorithms to calculate new values for a tone reproduction curve associated with the selected media and halftone screen. The TRC updater 630 then stores the updated values in a tone reproduction curve or lookup table associated with the first and second image attributes. For example, the calculated tone reproduction curve values are transferred to the Contone Rendering Module 618 and are stored in a Tone Reproduction Curve or lookup table associated with selected first and second image attributes (the selected media/screen).

Figure 7:
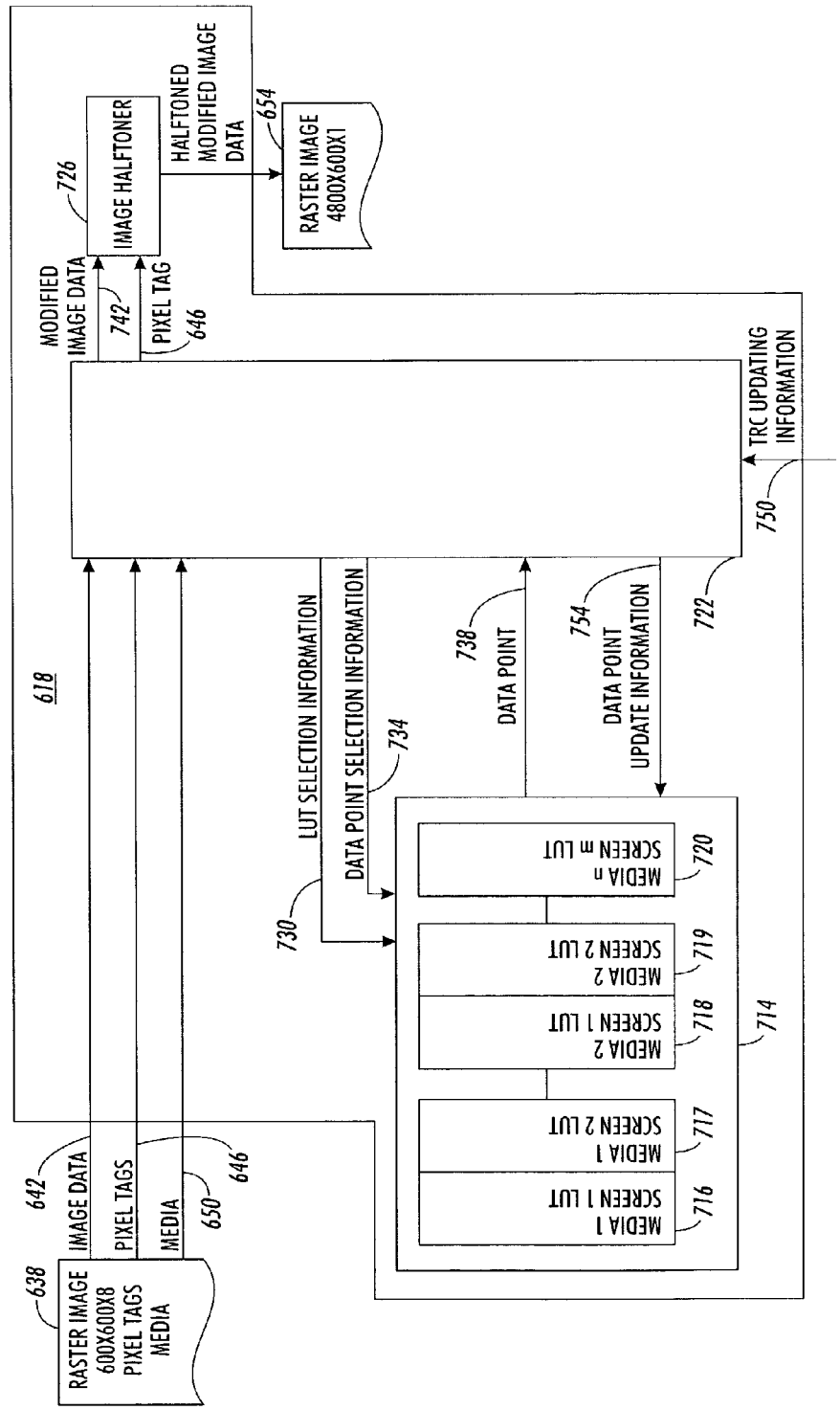
FIG. 7 is a block diagram showing additional detail of a portion of the system of FIG. 6.

Referring to FIG. 7, the Contone Rendering Module 618 includes a set 714 of image attribute compensating look-up-tables (LUT) or TRCs. Each lookup table or TRC 716–720 contains data for compensating image data for correct appearance under a particular combination of image attributes. The lookup tables or TRCs 716–720 can be one dimensional (for black and white or single color separations) or multidimensional (for full color contone data). The Contone Rendering Module 618 also includes an image attribute compensation processor 722 and an image halftoner 726. The image attribute compensation processor 722 receives the image data 642, pixel tag 646, and media selection 650 information from the contone raster image 638. The image attribute compensation processor 722 uses the pixel tag information 646 (or screen selection information) and media selection 650 to generate lookup table or TRC selection information 730. Additionally, the image attribute compensation processor 722 uses the contone image data 642 to generate data point selection information 734. The lookup table or TRC selection information 730 is used to select one of the image attribute compensation TRCs 716–720 for use in compensating the current raster image 638. For example, where the media selection information 650 indicates that an image is to be rendered on media type 1 (e.g., glossy paper) and the pixel tag information 646 indicates that a type 2 (e.g., dot) halftone screen is to be used to render the image, look-up-table or TRC selection information 730 is generated that indicates that the lookup table labeled 717 is to be used to adjust or modify the contone values of the raster image 638. For each pixel in the image data 642, data point selection information 734 is generated. The data point selection information 734 is used to select or address and retrieve one or more data points 738 from the selected lookup table.

The image attribute compensation processor 722 uses the received data point information 738 to modify the image data 642 to generate modified image data 742. For example, the data point information 738 includes a plurality of values from the selected lookup table. The plurality of values is used in an interpolation algorithm. For example, the plurality of values is used in a trapezoidal interpolation algorithm to generate a coefficient or an offset value to be applied to a pixel value in the image data 642. The application of the coefficient or offset value generates a modified pixel value that is part of the modified image data 742. The modified image data 742 and the pixel tag information 646 are passed to the image halftoner 726.

The image halftoner 726 uses the halftone screen indicated in the pixel tag information 646 to halftone the modified image data thereby generating the halftoned raster image 654 which is used to render an image as described in reference to FIG. 6.

As described in reference to FIG. 6, TRC updater 630 receives image quality information from the image quality sensor 626. TRC updater 630 generates TRC updating information 750. TRC updating information 750 includes, for example, new data point selection information 734 and updated information related 754 to that new data point selection information 734. The image attribute compensation processor receives the TRC updating information 750 generates the new data point selection information 734. The look-up-table or TRC selection information 730 remains unchanged because the TRC updating information is related to the media image 662 generated with the current or most recently received contone raster image information 638. The new data point selection information 734 selects points within the selected lookup table or TRC (e.g., 717) that the TRC updater indicates need to be updated. Alternatively, all the data points in the selected lookup table or TRC (e.g., 717) are routinely selected and updated.

The image attribute compensation processor 722 stores data point update information 754 to the one or more points indicated by the new data point selection information 734, thereby updating the selected lookup table (e.g., 717). The updated information is used to modify subsequent image data in a print job that is to be rendered based on the first and second attributes. For example, a subsequent image in a print job to be rendered on the first media type with second halftone screen type are modified based on the new compensation information stored in the selected look-up-table or TRC (e.g., 717).

Those of skill in the art will understand that in some embodiments a system may include a plurality of contone rendering modules. For example, image data 642, pixel tag 646, and media selection 650 information may be directed to three or four contone rendering modules. Each of the contone rendering modules might, for example, use single dimensional lookup tables or TRCS to process data related to a single color separation. The output of the plurality of contone rendering modules is then delivered to, for example, a raster output scanner. However, in the exemplary embodiments a single contone rendering module uses, for example, single or multidimensional lookup tables or TRCs to process black and white or multicolor image data respectively.

A second embodiment 810 of a system operative to compensate for system performance changes related to image attributes includes a raster image processor 614, a raster output scanner 622, an image quality sensor 626, and a TRC updater 630 that are similar in structure and function to the like named and referenced components of the first embodiment 610 described in reference to FIG. 6. Additionally, the second embodiment 810 includes a contone rendering module 818, a system performance sensor 822 and a second TRC updater 826.

When the second embodiment 810 receives a diagnostic image 634, the raster image processor 614 generates a raster image 638 including image data 642, pixel tags 646 and media selection information 650 as described in reference to the first embodiment. The contone rendering module 818 receives the image 642, tag 646 and media 650 information and modifies it as required to compensate for system performance changes related to selected first and second attributes, as well as other system performance changes. For example, as will be described in greater detail in reference to FIG. 9, the contone rendering module 818 includes a process control TRC for compensating system drifts due to, for example, system age, temperature, and humidity.

For instance, as described in reference to FIG. 1, the system performance sensor 822 can be a densitometer. The raster output scanner 622 can cause test patches of toner to be placed in inter-document spaces on the photoreceptor. For example, the toner patches have a target toner density associated with them. The densitometer generates a toner density signal and delivers it to the second TRC updater 826. The second TRC updater 826 compares the received density signal to one or more expected or target density signals. The second TRC 826 updater generates new or updated process control TRC values and delivers them to the contone rendering module 818. As will be explained in greater detail in reference to FIG. 9, the contone rendering module 818 uses the information received from the second TRC updater 826 to update a process control TRC.

During an image aspect compensation update, the contone rendering module 818 receives image 642, tag 646 and media selection information 650 and compensates the image data for system performance changes related to the first and second selected image attributes as described in reference to FIG. 6 and FIG. 7. Additionally, the contone rendering module 818 also adjusts the image data to compensate for overall system performance changes such as those described in reference to the system performance sensor 822 and second TRC updater 826. Once the image contone values are adjusted for both kinds of factors, the contone rendering module 818 generates the halftone raster image 830. The halftone raster image 830 is delivered to the raster output scanner 622 which operates as described in reference to FIG. 6 to generate a photoreceptor image 834 and a media image 838 which is compensated for both overall system performance changes and system performance changes related to the selected first and second attributes. The image quality sensors 626 and first TRC updater operate as described in reference to FIG. 6 to provide updated information related to the first and second attributes to the contone rendering module 818 and to provide the contone rendering module updated compensation information with regard to the first and second attributes.

Figure 9:
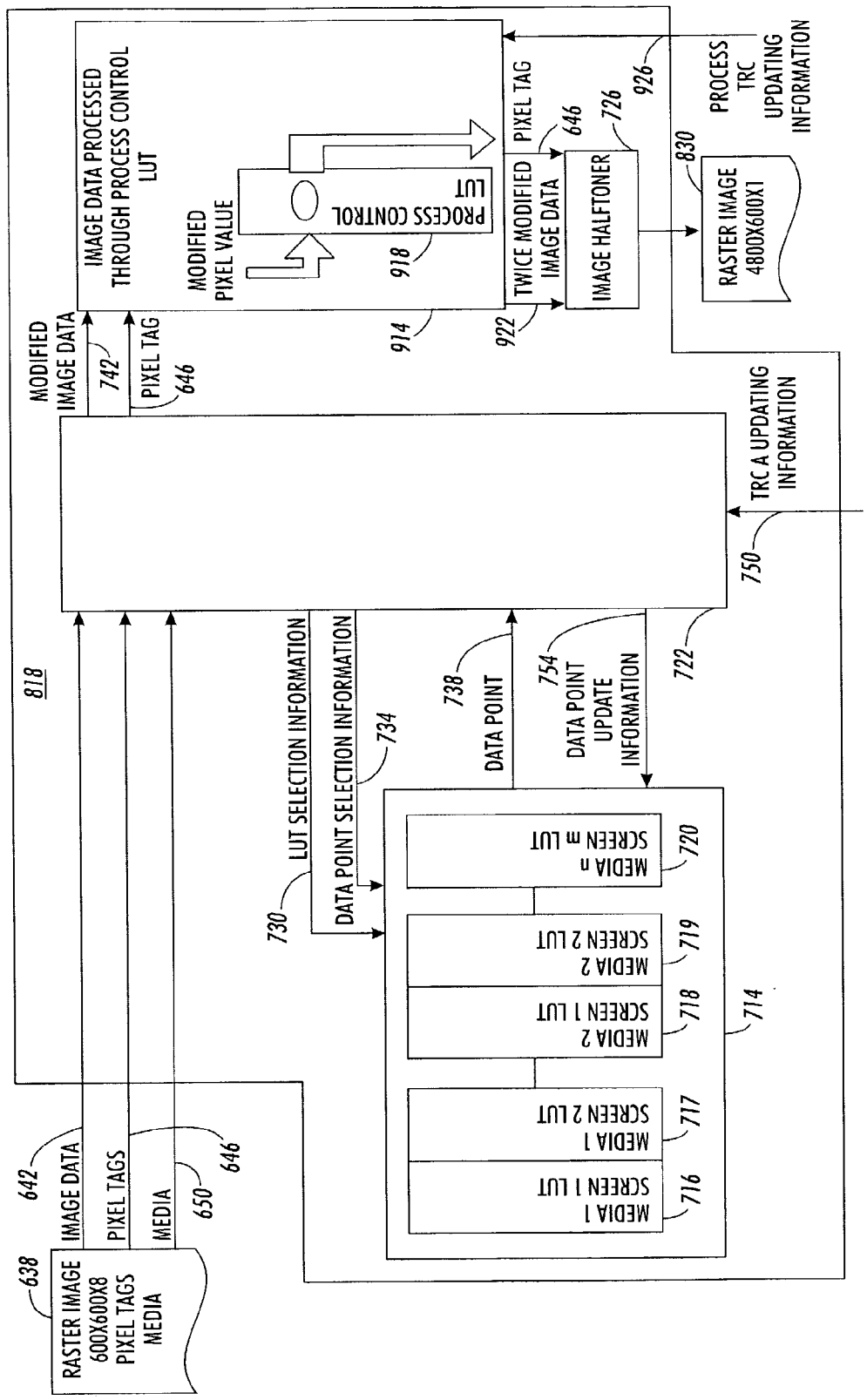
FIG. 9 is a block diagram showing additional detail of a portion of the system of FIG. 8.

Referring to FIG. 9, the contone rendering module 818 of the second embodiment 810 includes a set of lookup tables or TRCs 714 and an image attribute compensation processor 722 similar to those described with reference to FIG. 7. The image attribute compensation processor 722 receives image, tag and media selection data 642, 646, 650, and generates LUT or TRC selection information 730 and data point selection information 734 and uses it to retrieve appropriate data points from the set 714 of lookup tables or TRCs. As described above, the image attribute compensation processor 722 uses the data point information 738 and the image data 642 to generate modified image data 742. Additionally, as described above, during compensation update periods, the image attribute compensation processor 722 receives TRC updating information 750, which it uses to generate new data point selection information 734 and data point update information 754 for updating the selected lookup table or TRC that is addressed by the lookup table or TRC selection information 730.

Additionally, the contone rendering module 818 includes a process control processor 914. The process control processor has access to a process control look-up-table or TRC 918. The process control processor 914 receives the modified image data 742 and pixel tag information 646 from the image attribute compensation processor 722 or from the raster image 638. The process control processor modifies the modified image data 742 a second time to produce twice-modified image data 922. For example, the process control processor uses a modified pixel value from the modified image data 742 to generate one or more index values into the process control look-up-table 918. The process control processor 914 uses the one or more index values to retrieve one or more data points from the process control look-up-table 918. The process control processor 914 uses one or more data points to generate the twice-modified image data 922. For example, the one or more data points are used in an interpolation algorithm, such as, for example, a tetrahedral interpolation algorithm. The result of the interpolation algorithm is used as the twice-modified image data 922. The process control processor 914 passes the twice-modified image data 922 and the pixel tag information 646 to the image halftoner 726. As explained above in reference to FIG. 7, the image halftoner uses the information it receives to generate the halftone raster image 830.

Figure 8:
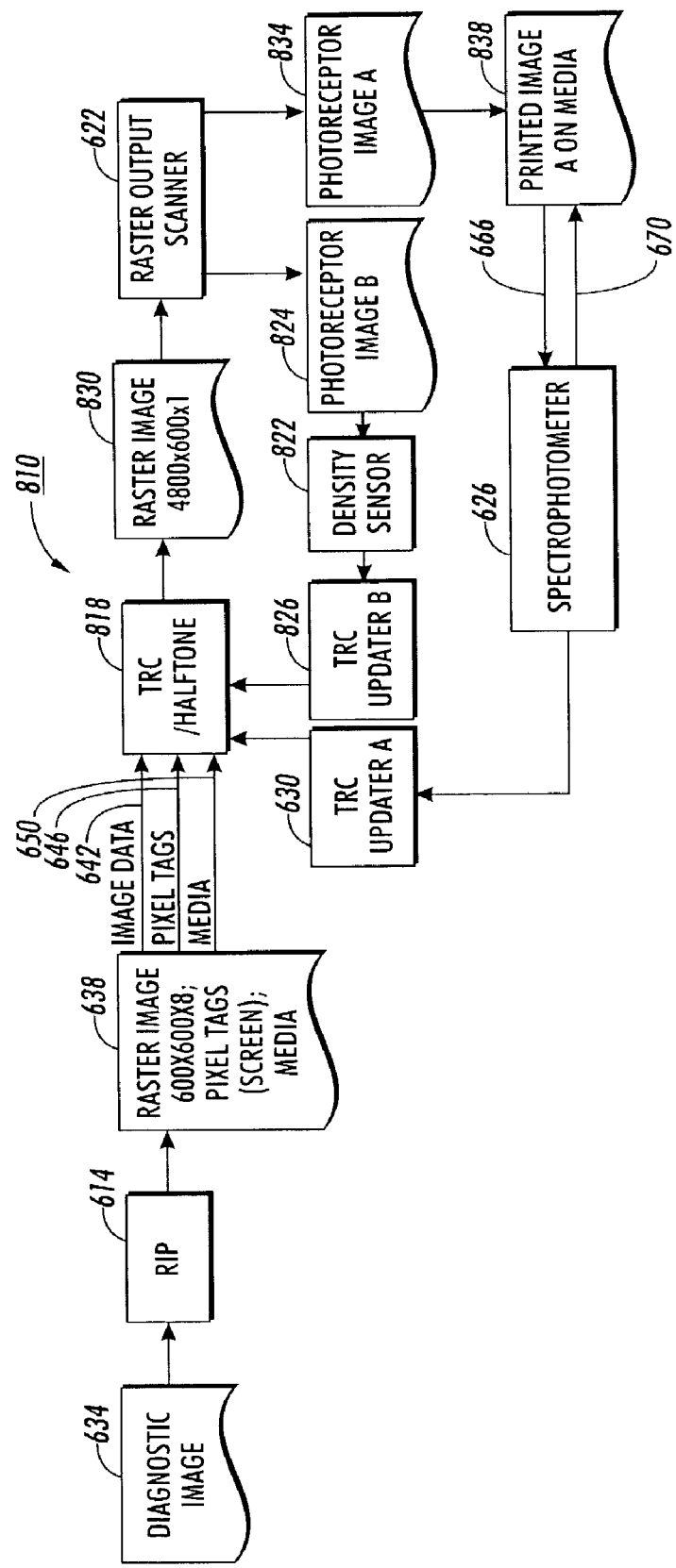
FIG. 8 is a block diagram of portions of a second exemplary system that is operative to perform the method of FIG. 4 in combination with methods similar to those described in reference to FIG. 1.

The process control processor 914 also receives process TRC updating information 926 from the second TRC updater 826 described in reference to FIG. 8. The process control processor 914 uses the process TRC updating information 926 to modify or update values in the process control lookup table 918.

Figure 10:
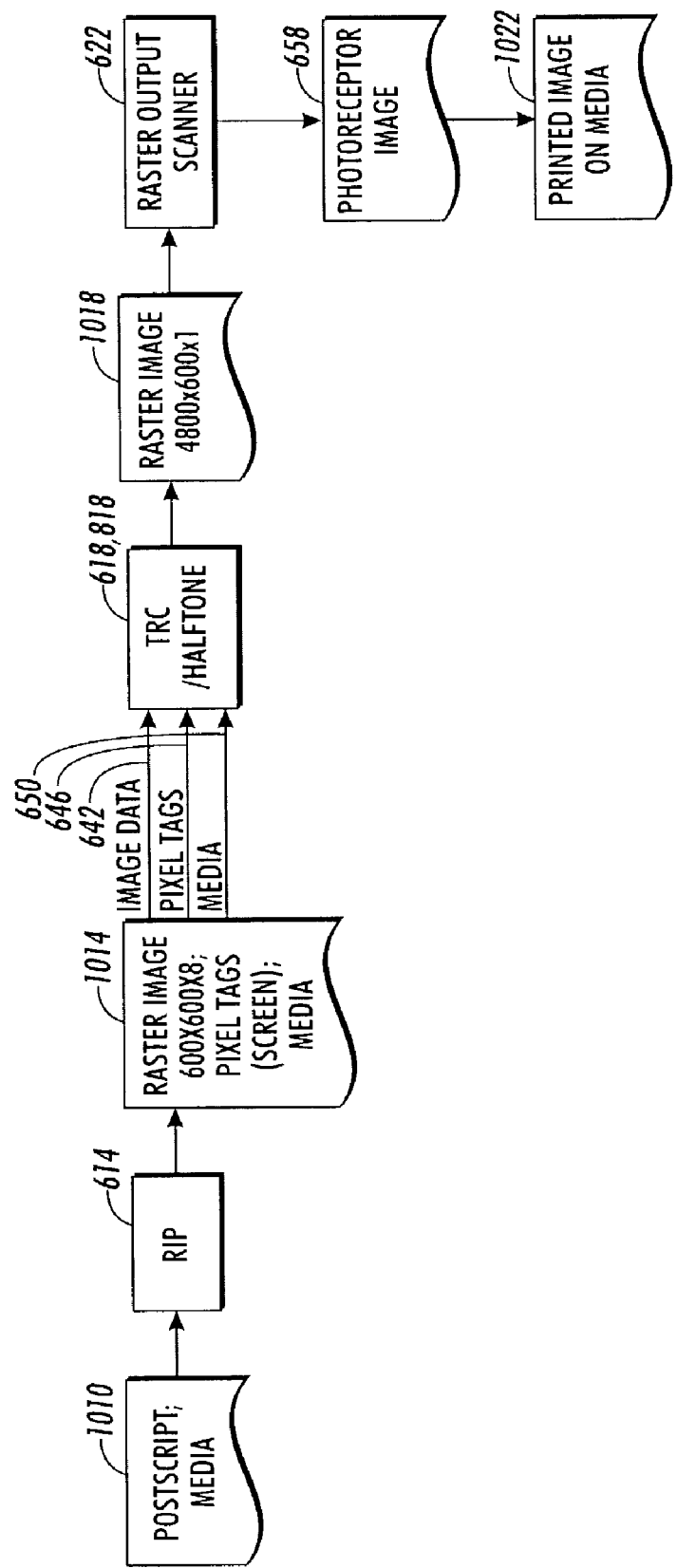
FIG. 10 is a block diagram depicting relevant portions of the system of FIG. 6 or FIG. 8 during the production of a print job image.

Referring to FIG. 10, during print job processing, the raster image processor 614 receives print job image descriptions 1010. The raster image processor 614 generates a contone raster image 1014 based on the print job image description 1010 including image data 642, pixel tag information 646 and media selection information 650. The contone rendering module 618 or 818 receives the contone raster image information 642, 646, 650 and modifies the image data 642 through the use of one or more lookup tables as described in reference to FIG. 7 or FIG. 9. Image attribute information such as screen selection information contained in the pixel tags 646 and media selection information 650 are used to select from among a set 714 of image attribute compensation look-up-tables or TRCs, and image data is used to generate an index into the selected table. Data from the table is used to modify the image data to compensate for system performance changes related to the image attributes. If the contone rendering module includes a process control processor 914 and a process control lookup table or TRC 918, then the contone rendering module can modify the modified image data a second time. Whether the contone rendering module is the contone rendering module 618 of the first exemplary embodiment 610 or the contone rendering module 818 of the second exemplary embodiment 810, the contone rendering module generates a halftone raster image 1018 based on the contone raster image 1014 and the compensating information stored in association with the contone rendering module 618 or 818. The raster output scanner receives the halftoner raster image 1018 and produces an image on, for example, a xerographic photoreceptor. The photoreceptor image 658 is transferred to media of the type selected by the media selection information 650 to produce a print job media image 1022.

A print job can be interrupted as often as necessary to produce diagnostic images to update the image aspect compensating TRCs 714. For example, diagnostic images can be printed at the beginning of a print job, at regular intervals during the print job, or whenever selected image aspects change during the print job. For example, an image aspect TRC can be updated along with a change in a media type or a halftone screen type during a print job. Where a system includes an overall system performance sensor such as the system performance sensor 822 described in reference to FIG. 8, a system performance TRC can be updated without interrupting the print job. As explained above, when the system performance sensor 822 is a densitometer, measurements can be made in inter-document spaces on a photoreceptor without interrupting the print job.

The invention has been described with reference to particular embodiments. Modifications and alterations will occur to others upon reading and understanding the specification. For example, the functions of the process control processor and the image attribute compensation processor can be combined into one overall processor. One processor can be both a process control processor and an image attribute compensation processor. Furthermore, such an overall processor can perform additional tasks. The information stored in a process control look-up-table can instead be combined with the information stored in each of the image attribute compensation look-up-tables, thereby eliminating the need for the separate process control look-up-table. However, to do so might require coordination or synchronization between the production or sensing and analysis of diagnostic images and system performance evaluations such as photoreceptor color patch generation and analysis. The various components and functional blocks described above can be distributed in any convenient manner among the components of an image processing system. For example, a contone rendering module can be implemented in a digital front end (DFE) or in a print engine.

Furthermore, the functions of a contone rendering module can be performed by different components. For example, image attribute compensation may performed in a DFE while the process control and halftoning aspects of the contone rendering module are performed in a print engine. While the image attribute compensating LUTs or TRCs have been described as a set of individual LUTs, the information contained with in the image attribute compensating LUTs can be stored in or considered to be in a multidimensional array or LUT, wherein the first aspect and second aspect are used as additional indices into the multidimensional array. The halftone screen may be a digital halftone screen, an analog halftone screen, or a combination digital and analog halftone screen. While the invention has been described in terms of a xerographic print engine including a raster output scanner and photoreceptors, the invention can be applied equally well to other rendering devices. For example, the invention can be beneficially applied to lithographic, ionographic, ink jet, photographic and other kinds of print engines. It is intended that all such modifications and alterations are included insofar as they come within the scope of the appended claims or equivalents thereof.

What is claimed is:

1. A method of compensating for system performance changes related to a combination of image attributes in an image rendering system, the method comprising:
    selecting a first image attribute;
    selecting a second image attribute;
    changing a value of at least one of the first attribute and the second attribute;
    rendering a diagnostic image based on the changed value of the first and second attribute combination;
    sensing an image quality from the rendered diagnostic image;
    reporting the sensed image quality to a compensation processor;
    the compensation processor comparing the reported sensed image quality to expected target system performance values;
    the compensation processor calculating first attribute/second attribute tone reproduction curve or compensating lookup table data based on the sensed image quality if the compensation processor determines that there is a significant difference between the expected target system performance values and the reported sensed image quality;
    storing the first attribute/second attribute tone reproduction curve or lookup table data for use in rendering images having the changed first and second attribute combination values;
    receiving production image data for a production image having the first and second attribute values; and,
    applying the stored first attribute/second attribute tone reproduction curve or lookup table data to the received production image data, thereby generating compensated image data.

2. The method of compensating for system performance changes related to image attributes of claim 1 wherein selecting a first image attribute and selecting a second image attribute comprises:
    selecting an image media type attribute; and,
    selecting a halftone screen attribute.

3. The method of compensating for system performance changes related to image attributes of claim 1 wherein rendering a diagnostic image-comprises:
    rendering a test patch image having the changed first and second attribute value combination.

4. The method of compensating for system performance changes related to image attributes of claim 1 wherein rendering a diagnostic image comprises:
rendering a print job image having the changed first and second attribute value combination to be used for diagnostic sensing.

5. The method of compensating for system performance changes related to image attributes of claim 1 wherein sensing the image quality from the rendered image comprises:
collecting spectrophotometric measurements from the rendered image.

6. The method of compensating for system performance changes related to image attributes of claim 1 wherein calculating first attribute/second attribute tone reproduction curve or lookup table data comprises:
calculating tone reproduction curve or lookup table data for a tone reproduction curve or lookup table for compensating image data in regard to a print media/halftone screen combination.

7. The method of compensating for system performance changes related to image attributes of claim 1 wherein storing the first attribute/second attribute tone reproduction curve data comprises:
updating tone reproduction curve or lookup table data associated with a particular print media/halftone screen combination.

8. The method of compensating for system performance changes related to image attributes of claim 1 wherein storing the first attribute/second attribute tone reproduction curve or lookup table data comprises:
combining the first attribute/second attribute tone reproduction curve or compensating lookup table data with process control tone reproduction curve or lookup table data, thereby generating combined first attribute/second attribute/processes control tone reproduction curve or lookup table data; and
storing the combined first attribute/second attribute/processes control tone reproduction curve or lookup table data.

9. A method of rendering a print job, the method comprising:
selecting a first image attribute;
selecting a second image attribute;
receiving value information regarding at least one first attribute/second attribute value combination associated with the print job;
determining that system performance for at least one of the at least one first attribute/second attribute value combination should be analyzed;
rendering a diagnostic image based on the at least one first attribute/second attribute value combination for which it was determined that system performance should be analyzed;
sensing an image quality from the rendered diagnostic image;
reporting the sensed image quality to a compensation processor;
the compensation processor comparing the reported sensed image quality to expected target system performance values;
the compensation processor calculating new first attribute/second attribute value combination tone reproduction curve or look up table data based on the sensed image quality for those first attribute/second attribute value combinations that the image aspect compensation processor determines that there is a significant difference between the expected target system performance values and the reported sensed image quality;
storing the calculated new first attribute/second attribute value combination tone reproduction curve or lookup table data;
the compensation processor selecting appropriate stored first attribute/second attribute value combination tone reproduction curve or lookup table data for adjusting contone values of portions of the print job according to first attribute/second attribute value combinations associated with the portions;
the image aspect compensation processor adjusting contone values of the portions of the print job according to the selected stored first attribute/second attribute value combination tone reproduction curve or lookup table data; and
rendering the associated portions of the print job based on the adjusted contone values.

10. The method of rendering an image of claim 9 further comprising:
generating halftoned data based on the adjusted contone value.

11. The method of rendering a print job image of claim 9 wherein selecting a first image attribute and selecting a second image attribute comprises:
selecting an image media type attribute; and,
selecting a halftone screen attribute.

12. The method of rendering a print job image of claim 9 wherein rendering a diagnostic image comprises:
rendering a test patch image having the first attribute/second attribute combination values.

13. The method of compensating for system performance changes related to image attributes of claim 9 wherein rendering a diagnostic image comprises:
rendering a print job image having the first attribute/second attribute value combination to be used for diagnostic sensing.

14. The method of rendering a print job image of claim 9 wherein sensing an image quality from the rendered diagnostic image comprises:
collecting spectrophotometric measurements from the rendered image.

15. The method of rendering a print job image of claim 9 wherein calculating first attribute/second attribute tone reproduction curve or lookup table data comprises:
calculating tone reproduction curve or lookup table data for compensating image data in regard to a print media/halftone screen combination.

16. The method of rendering an image of claim 9 wherein storing the calculated new first attribute/second attribute value combination tone reproduction curve or lookup table data comprises:
combining the new first attribute/second attribute tone reproduction curve or compensating lookup table data with process control tone reproduction curve or lookup table data, thereby generating new combined first attribute/second attribute/processes control tone reproduction curve or lookup table data; and
storing the new combined first attribute/second attribute/processes control tone reproduction curve or lookup table data.

17. An image processing system comprising:
a set of image aspect compensation tone reproduction curves or at least one lookup table, each tone reproduction curve or at least one lookup table of the set being associated with a particular combination of two or more image aspects;

an image quality sensor operative to measure one or more image qualities from a rendered image;

an image aspect compensation processor operative to receive image data and information regarding the two or more image aspects, select tone reproduction curve or at least one lookup table from the set of image aspect compensation tone reproduction curves or at least one lookup table based on the information regarding the two or more image aspects, generate modified diagnostic image data based on information received from the selected tone reproduction curve or at least one lookup table and diagnostic image data, orchestrate a rendering of a diagnostic image based on the modified diagnostic image data and the two or more image aspects, receive sensed image quality information regarding the diagnostic image from the image quality sensor, compare the received sensed image quality information regarding the diagnostic image to expected target system performance values and update portions of the selected set of image aspect compensation tone reproduction tone curves or at least one lookup table based on information generated by the image quality sensor if the compensation processor determines that there is a significant difference between the expected target system performance values and the received sensed image quality information, and generate modified image data based on information received from the selected tone reproduction curve or at least one lookup table and the received image data; and a rendering device operative to render the diagnostic image and an image based on the modified image data and two or more image aspects.

18. The image processing system of claim 17 wherein the image quality sensor is a spectrophotometer.

19. The image processing system of claim 17 wherein the rendering device comprises a xerographic print engine.

20. The image processing system of claim 17 further comprising:

a process control tone reproduction curve;

a system performance sensor; and a process control processor operative to receive modified image data, generate twice modified image data based on information received from the process control tone reproduction curve and the received modified image data, and update portions of the process control tone reproduction curve based on information generated by the system performance sensor.

21. The image processing system of claim 17 wherein the image aspect compensation processor is operative to update portions of the set of image aspect compensation tone reproductions curves or at least one lookup table based on information generated by the image quality sensor by combining the new first attribute/second attribute tone reproduction curve or compensating lookup table data with process control tone reproduction curve or lookup table data, thereby generating new combined first attribute/second attribute/ processes control tone reproduction curve or lookup table data and storing the new combined first attribute/second attribute/processes control tone reproduction curve or lookup table data.

\* \* \* \* \*